3,171,880
MONOPULSE RADAR BEAM SIMULATION
Irving Feinberg, Wayne, N.J., assignor to Curtiss-Wright Corporation, a corporation of Delaware
Filed July 23, 1962, Ser. No. 211,666
4 Claims. (Cl. 35—10.4)

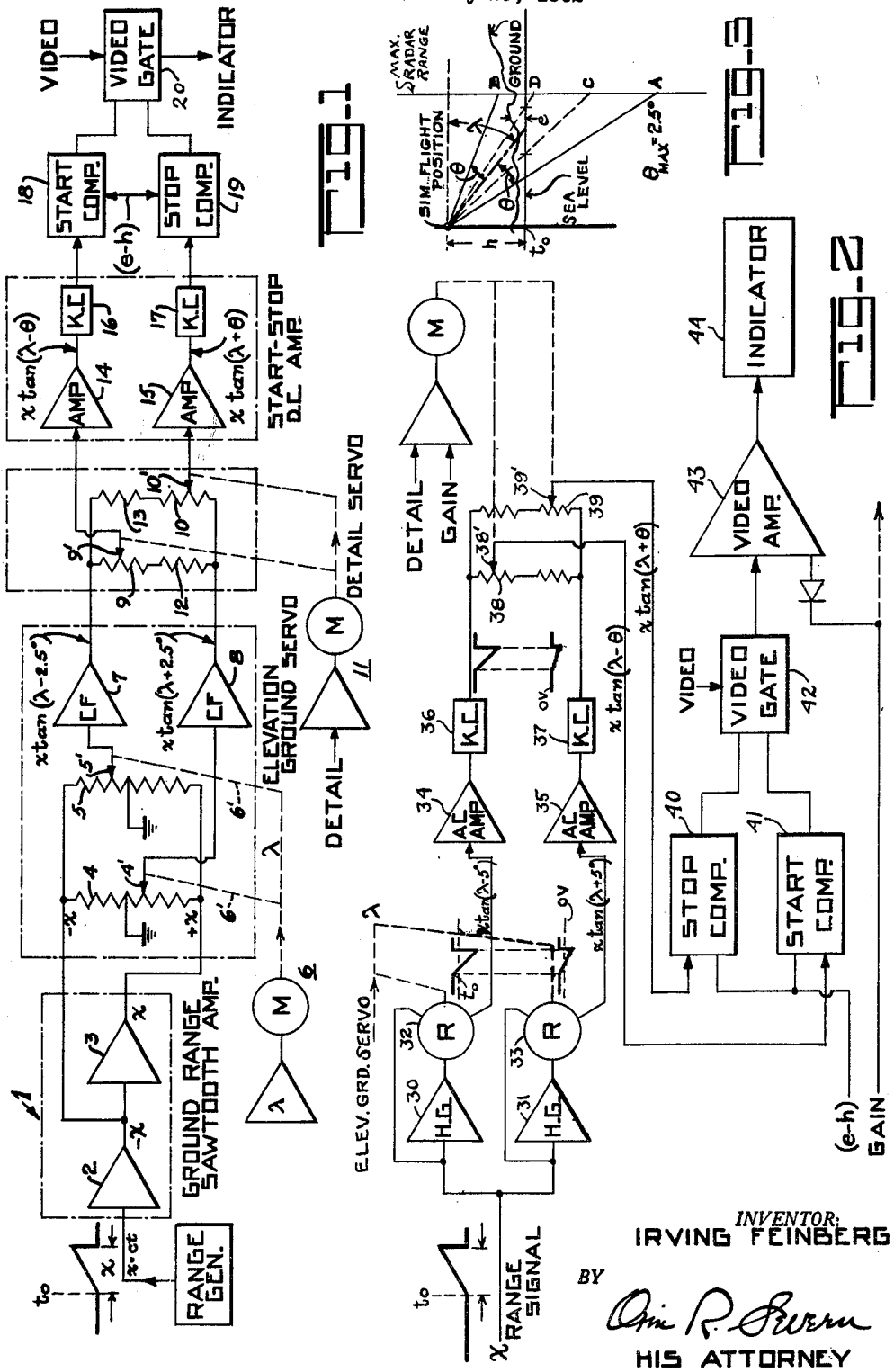

This invention relates to radar simulation and in particular to the simulation of the effective variable vertical beam width in a monopulse radar system.

There is disclosed in Patent No. 3,131,247, granted 28 April 1964, for "System for Simulating Land Mass Radar Reception," means for simulating certain types of radar beams. In the aforesaid case, the radar beam is represented and displayed as of fixed vertical width, which in fact is the character of an actual monopulse radar beam. However, the displayed radar reception introduces an apparent variation in vertical beam width, and it is important that this effect be simulated for realistic radar training of operating personnel.

By way of explanation, narrow beams, generally defined as less than 10°, are in practice produced by so-called monopulse radar. Here, the transmitted electromagnetic energy is in the form of single pulses, a reflected pulse being picked up on two separate beam patterns on the antennae, so that there is in effect reception of two pulses. By this technique, important information is obtained such as range versus the elevation angle and range versus the azimuth angle. The monopulse radar is unique in that the effective two pulses so received can be put to use for producing the effect of a variable vertical beam width.

A principal object of the present invention therefore is an improved radar simulating system for representing the effective vertical beam width in a monopulse radar system.

The invention will be more fully set forth in the following description referring to the accompanying drawing, and the features of novelty will be pointed out with particularity in the claims annexed to and forming a part of this specification.

Referring to the drawing,

FIG. 1 is a block-schematic illustration of a radar simulating system for variable vertical beam width representation;

FIG. 2 is a similar illustration of a modified form of FIG. 1 for obtaining higher precision and accuracy, and FIG. 3 is a graph showing circuitry-beam width relation.

In FIG. 1, a source of signals comprising a saw-tooth generator, "RANGE GEN.," produces a saw-tooth voltage signal $x$ representing ground or range distance, i.e. the horizontal projection of the assumed radar beam from a point representing the simulated air-borne radar to a base plane. The signal $x$ is measured on a time base from $t_0$, an advanced reference time, as described in the aforesaid Patent No. 3,131,247.

The signal is passed through a conventional saw-tooth amplifier unit 1 that produces at 2 and 3 signals of opposite sense, $-x$ and $+x$, respectively. These signals are used generally in the manner shown in the aforesaid application Serial No. 56,868 to energize a pair of trigonometric tangent function generators or potentiometers (hereinafter called "pots") 4 and 5 having grounded center taps. The respective slider contacts 4′ and 5′ are initially positioned so that slider 4′ is slightly below the ground tap to represent an angle, +2.5°, and the slider 5′ is slightly above the corresponding ground tap to represent an angle, −2.5°. These angles each represent half the beam width angle $\theta$, here represented as 5°.

The pots 4 and 5 comprise part of an elevation ground servo system controlled by a servo 6 that positions the sliders through mechanical connections indicated at 6′, according to variation in the simulated antennae tilt angle $\lambda$, which in the present instance is also the flight path angle. It is assumed here that the radar is carried in an aircraft for terrain avoidance purposes. Accordingly, the derived function voltages at the sliders 4′ and 5′ respectively are $x \tan (\lambda+2.5°)$ and $x \tan (\lambda-2.5°)$.

These signals are fed through the isolating cathode follower (CF) amplifiers 7 and 8 respectively to energize the pair of linear pots 9 and 10 of the "detail" servo system 11. This servo is controlled by the student for representing the specific radar design. The linear pots 9 and 10 are in series respectively with proportioning resistances 12 and 13.

Referring again to the tangent function signals from pots 4 and 5, the derived signal voltages at points A and B may represent diagrammatically, as shown in FIG. 3, maximum beam ($2\theta$) limit positions at points A and B on a vertical reference. The derived signal voltages at the sliders of pots 9 and 10, points C and D, represent the limit positions on the reference of the radar beam width that is simulated. Accordingly, the signals from the pots 9 and 10 represent the beam coverage of terrain elevation, the range, altitude and antennae tilt (or flight angle) being taken into consideration. Where the antennae is fixed for alinement with the horizontal axis of the aircraft, it will be apparent that the flight angle and the antennae tilt angle $\lambda$ are the same.

The aforesaid tangent function signals from pots 9 and 10 are fed to the start-stop D.C. amplifying system including D.C. scale factor amplifiers 14 and 15, the outputs of which are modified by so-called "keyed clamps" (KC) or "synchronous clamps" 16 and 17, for restoring the D.C. or zero level. Such circuitry is shown, for example, in "Pulse and Digital Circuits," by Millman and Taub, published by McGraw-Hill Book Company, pp. 447 to 457.

The restored D.C. signals are then fed to respective comparators 18 and 19, which also received the $(e-h)$ signal for controlling transmission of signals to the "video gate" as indicated. The $(e-h)$ signal is computed in the aforesaid application Serial No. 56,868, and represents the difference between the aircraft (radar) altitude $h$ with reference to sea level and the elevation $e$ of the terrain point at which the radar beam is directed, i.e. the radar altitude with reference to the horizontal plane determined by said terrain point.

It will be apparent that where in actual practice the radar is used for terrain avoidance and is fixed to the aircraft for directing the beam substantially along the longitudinal axis of the fuselage, no terrain signal will be received if the plane is in level flight at material altitude. However, if the plane were to go into a dive, or be at too low altitude in level flight, the radar beam would pick up terrain, thereby giving the pilot the required information.

This operation is simulated by means of the "stop" and "start" comparators, together with the "video gate" for transmitting the video signals to the simulated radar scope or indicator. The $(e-h)$ signal is compared separately with the upper and lower limit voltage signals, $x \tan (\lambda-\theta)$ and $x \tan (\lambda+\theta)$, and the resultant signal in each case fed to the "video gate." The "video" signal fed to the gate is from the basic transparency-scanner system for representing terrain characteristics, and energizes the display indicator as disclosed in the aforesaid application Serial No. 56,868.

FIG. 2 shows a modified form of the circuitry of FIG. 1 that is basically the same, except for improvements in circuit design and certain components. Here, the range signal $x$ is fed to a pair of high gain (HG) amplifiers 30 and 31, the respective outputs of which energize a pair of electromagnetic resolvers 32 and 33 in the manner shown. The resolvers are designed to produce tangent function signals as in the case of the function generating pots 4 and 5 of FIG. 1. However, the accuracy of resolution is materially higher in the resolvers, and the cumulative effect of the comparatively low error at the circuitry output is reasonably low. Resolvers of this character are disclosed in "Resolver Handbook," published by Reeves Instrument Corporation.

The resolvers 32 and 33 are controlled, as indicated, by the elevation ground servo, shown at 6 in FIG. 1, so as to adjust the resolvers according to the antennae tilt angle $\lambda$. The resulting output signals are $x \tan (\lambda - 5°)$ and $x \tan (\lambda + 5°)$ respectively, which are fed to the respective A.C. scale factor amplifiers 34 and 35. The signals, now adjusted for scale factor, are fed through the keying clamps 36 and 37 (KC) for restoring the D.C. level, to energize the detail servo pots 38 and 39 that are operated in the manner of FIG. 1. The derived signals at sliders 38' and 39' now represent $x \tan (\lambda - \theta)$ and $x \tan (\lambda + \theta)$ respectively, and are fed together with the $(e-h)$ signal, to the "start" and "stop" comparators 40 and 41. The comparators function generally in the manner of FIG. 1 to energize the "video gate" 42 and control the transmission of video signals to the video amplifier 43 for display at the "indicator" 44. In addition, the "gain" control is applied to both the detail servo and the video amplifier 43 for enabling the student to obtain optimum detail and clarity of the display at the indicator.

An important advantage of the present invention is that for terrain avoidance training, the narrow beam can be simulated for training the pilot to fly close to but just above (between 500 and 1000 feet) natural or man-made obstacles (mountains, towers, etc.). When the plane is in level flight and the "detail" control is adjusted for wide beam width, the student will view terrain on the indicator at low altitudes.

If the beam width is adjusted by means of the detail control for a narrow beam width (1°), the student cannot view on the indicator any ground terrain unless the elevation of this terrain is approximately equal to or greater than the aircraft altitude. Thus the student has an indication for avoiding mountainous, etc. terrain.

A common error made by students operating the radar is the misadjustment of the gain control, causing incorrect beam width. This invention allows the student the same operational latitude. From the display, the student obtains the visual information that enables him to make the correct adjustments.

It should be understood that this invention is not limited to specific details of construction and arrangement thereof herein illustrated, and that changes and modifications may occur to one skilled in the art without departing from the spirit of the invention.

I claim:

1. In a system for simulating air-borne radar of the land-mass reception type, said system having a signal generating source for producing a signal representing the range distance of a radar beam to terrain within an assumed land-mass, means for producing a signal corresponding to the altitude of the radar with reference to a portion of terrain represented as under instant observation, a source of gated video signals representing characteristics of said terrain portion, and an indicator responsive to gated video signals, means for representing variable vertical width of the radar beam comprising function generating means responsive to said range signal and adjustable according to an assumed tilt angle of the radar antennae for producing signals representing tangent functions of the tilt angle and simulated vertical beam width, and summing and attenuating means responsive to said function signals and adjustable by the operator for producing two-pulse function signals for representing variable vertical beam width, said two-pulse signals controlling the gated video signals according to the aforesaid vertical beam width.

2. Radar simulating apparatus as specified in claim 1 wherein the tangent function means comprises a pair of electromagnetic resolvers.

3. Radar simulating apparatus as specified in claim 1 wherein the summing and attenuating means comprises a network including a pair of voltage deriving means for producing the simulated two-pulse vertical beam width signals.

4. Radar simulating apparatus as specified in claim 1 wherein a source of gain control modifies the adjustment of both the summing and attenuating means, and the gated video signals.

References Cited in the file of this patent

UNITED STATES PATENTS

| | | |
|---|---|---|
| 2,841,886 | Cutler | July 8, 1958 |
| 3,090,135 | Eisenberg | May 21, 1963 |
| 3,100,238 | Gray et al. | Aug. 6, 1963 |